United States Patent
Habeck

[11] Patent Number: 5,720,522
[45] Date of Patent: Feb. 24, 1998

[54] PORTABLE SEAT

[76] Inventor: John R. Habeck, 10 Primrose La., West Long Branch, N.J. 07764

[21] Appl. No.: 686,110

[22] Filed: Jul. 24, 1996

[51] Int. Cl.⁶ .............................. A47C 1/00; B60N 2/00; B08B 2/02
[52] U.S. Cl. .................... 297/337; 297/4; 297/183.1; 297/195.11; 297/338; 297/344.18; 297/423.38; 108/27; 108/44; 248/345.1; 248/188.5
[58] Field of Search ................................ 297/337, 338, 297/344.18, 4, 195.11, 440.24, 183.1, 183.5, 183.9; 108/27; 248/188.5, 354.5, 352, 345.1

[56] References Cited

U.S. PATENT DOCUMENTS

| | | |
|---|---|---|
| 406,328 | 7/1889 | Yagn ............................. 297/4 X |
| 671,638 | 4/1901 | Slagle .............................. 297/4 |
| 690,122 | 12/1901 | Slagle ........................... 297/4 X |
| 3,164,109 | 1/1965 | Atkinson ........................ 108/44 |
| 3,233,644 | 2/1966 | Bono ........................... 108/27 X |
| 3,625,563 | 12/1971 | Dickinson et al. ........... 297/338 X |
| 3,985,387 | 10/1976 | Rischar ........................... 297/4 |
| 4,089,276 | 5/1978 | Enos ............................. 108/44 |
| 4,183,579 | 1/1980 | Rojas ......................... 297/195.11 |
| 4,254,991 | 3/1981 | Venieris ..................... 297/344.18 |
| 4,494,465 | 1/1985 | Fick, Jr. ......................... 108/44 |
| 4,582,739 | 4/1986 | Givens ........................ 248/345.1 |
| 4,641,882 | 2/1987 | Young ..................... 297/195.11 X |
| 4,738,487 | 4/1988 | Shalinsky et al. ............... 297/338 |
| 4,884,842 | 12/1989 | Finkelstein ............... 297/344.18 X |
| 4,930,839 | 6/1990 | Saito et al. ..................... 297/338 |
| 5,197,381 | 3/1993 | Mells ............................. 108/44 |
| 5,303,981 | 4/1994 | Wilder et al. .................. 297/338 |
| 5,328,240 | 7/1994 | Neumuller ..................... 297/338 |
| 5,433,552 | 7/1995 | Thyu ....................... 297/344.18 X |
| 5,440,857 | 8/1995 | Shanok et al. ................ 108/27 X |
| 5,536,068 | 7/1996 | Valentor et al. ............ 297/183.1 X |

FOREIGN PATENT DOCUMENTS

| | | | |
|---|---|---|---|
| 222675 | 5/1987 | European Pat. Off. ............. 297/338 |
| 909494 | 4/1954 | Germany ............................ 297/4 |

*Primary Examiner*—Peter M. Cuomo
*Assistant Examiner*—Rodney B. White
*Attorney, Agent, or Firm*—Robert M. Skolnik

[57] ABSTRACT

A portable seat and includes a seat and a single adjustable length leg which can be folded against the seat. The leg, when unfolded, lies at an angle of about 135° with respect to the bottom of the seat. The angle between the leg and the bottom of the seat is selected such that the top of the seat will be horizontal when the bottom of the seat is placed on the top of the bumper of a vehicle. The seat is ideally suited for golfers, hunters and other sportspersons who need to change shoes when leaving and returning to the vehicle. The seat may also be used at "tailgate" parties by persons desiring to sit during the party. When folded, the seat can be conveniently stored in the vehicle's trunk or other storage area. The leg may include a foot rest support for the user's feet to more conveniently change shoes or for comfort.

8 Claims, 3 Drawing Sheets

PORTABLE SEAT

BACKGROUND OF THE INVENTION

1. Field of the Invention

This invention relates to a portable seat for golfer's, picnickers, and persons attending "tailgate" parties and sporting events. The seat is designed to be supported by the bumper of a motor vehicle and can be folded for storage in the motor vehicle. The seat has a leg portion and a seat portion. The leg rests on the ground and the seat on the bumper of a vehicle. The angle of the seat to the leg is approximately 135°.

2. Description of the Prior Art

The following prior art U.S. patents disclose devices using a portion of a vehicle for partial support.

Atkinson, U.S. Pat. No. 3,164,109 shows a serving tray for mounting in a vehicle. The tray includes a single leg support which is foldable up beneath the tray for storage. The body of the tray rests on a vehicle's dashboard or window and is secured by straps in slots.

Enos, U.S. Pat. No. 4,089,276, mounts a platform to the bumper of a vehicle for a mechanic to work on the engine.

Barksdale, U.S. Pat. No. 4,236,461, shows a table for attachment to the tailgate of a pickup truck or to the rear doors of a panel truck. FIGS. 1–2 for the pickup truck has a single leg and a pair of hooks mounted in holes in the tailgate.

Flick, U.S. Pat. No. 4,494,465, discloses a table which is supported between the trunk and the ground with a stay connected between the table and the lip of the trunk. The leg is adjustable in length.

Mells, U.S. Pat. No. 5,197,381, shows a chair which attaches to the trunk and is supported by the bumper.

SUMMARY OF THE INVENTION

The present invention is a portable seat and includes a seat and a single adjustable length leg which can be folded against the seat. The leg, when unfolded, lies at an angle of about 135° with respect to the bottom of the seat. The angle between the leg and the bottom of the seat is selected such that the top of the seat will be horizontal when the bottom of the seat is placed on the top of the bumper of a vehicle. The seat is ideally suited for golfers, hunters and other sportspersons who need to change shoes when leaving and returning to the vehicle. The seat may also be used at "tailgate" parties by persons desiring to sit during the party. When folded, the seat can be conveniently stored in the vehicle's trunk or other storage area. The leg may include a foot rest support for the user's feet to more conveniently change shoes or for comfort.

The seat includes handles formed integrally in the seating surface. The seat may be padded. A foot pad is provided at the end of the leg to prevent slippage. The seat also includes a protective lip so that no damage to the vehicle surface above the bumper will be likely to occur.

A principal object and advantage of the present invention is the provision of a portable seat. A still further object and advantage of the invention is the provision of a portable seat for use with a vehicle. Another object and advantage of the invention is the provision of a portable seat which can be stored in a vehicle. Another object of the invention is the provision of a seat which folds for storage in a vehicle and unfolds for use.

A still further object and advantage of the invention is the provision of a seat apparatus which mounts on the bumper of a vehicle. Another object and advantage of the invention is the provision of a seat which has a single leg at an angle of about 135° with the bottom of the seat when the leg is unfolded for use. Another object and advantage of the invention is the provision of a foot rest on the leg to conveniently enable a user to change shoes.

A still further object and advantage of the invention is the provision of a seat having carrying handles integrally formed in the seating surface. Another object and advantage of the invention is the provision of a seat which may be padded and which includes a protective lip between the back of the seat and a surface of the vehicle to prevent damage to the vehicle. A still further object and advantage of the invention is the provision of a seat which has an adjustable length leg to which is attached a foot pad to prevent slipping.

BRIEF DESCRIPTION OF THE DRAWINGS

These as well as further objects and advantages of the invention will become apparent to those skilled in the art from a review of the following detailed specification of my invention reference being made to the accompanying drawings in which.

DESCRIPTION OF THE PREFERRED EMBODIMENTS

Figure 1:
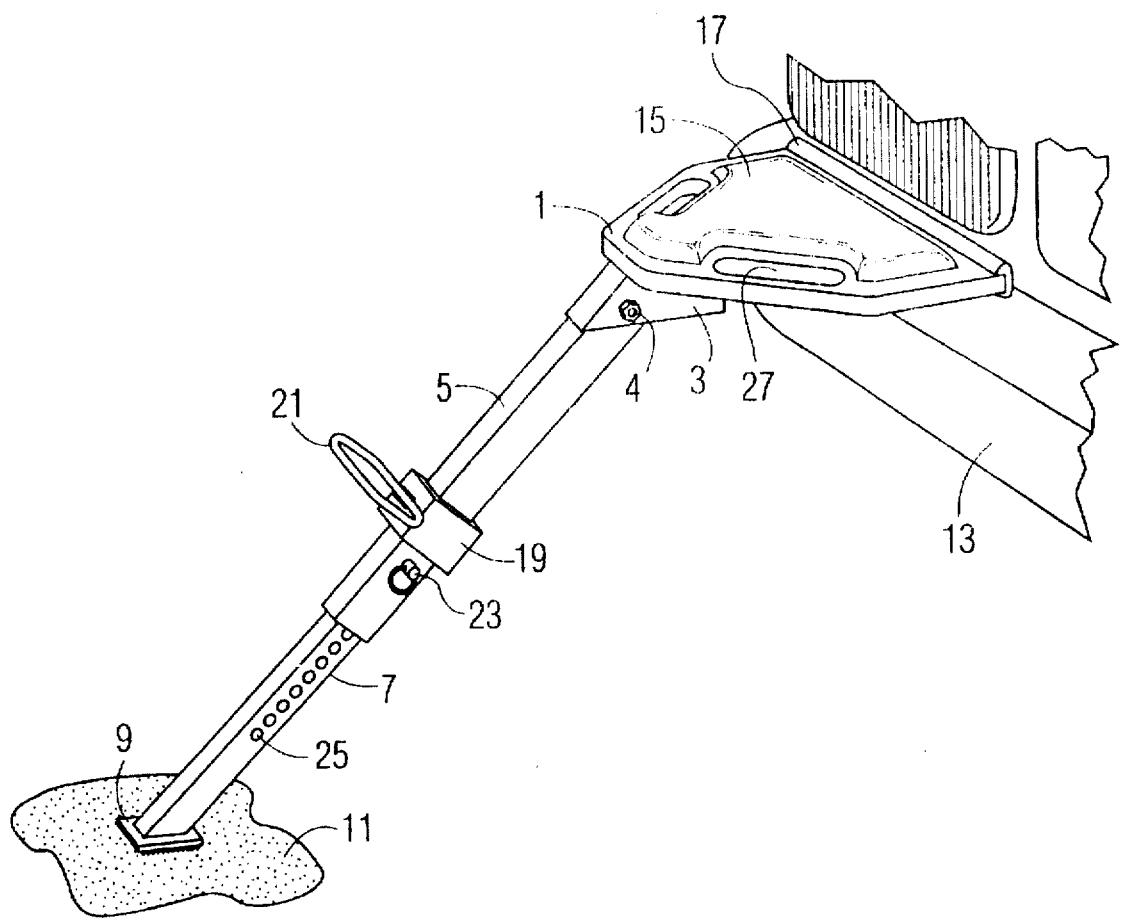
FIG. 1 is a perspective view of the portable seat in accordance with my invention.
Figure 2:
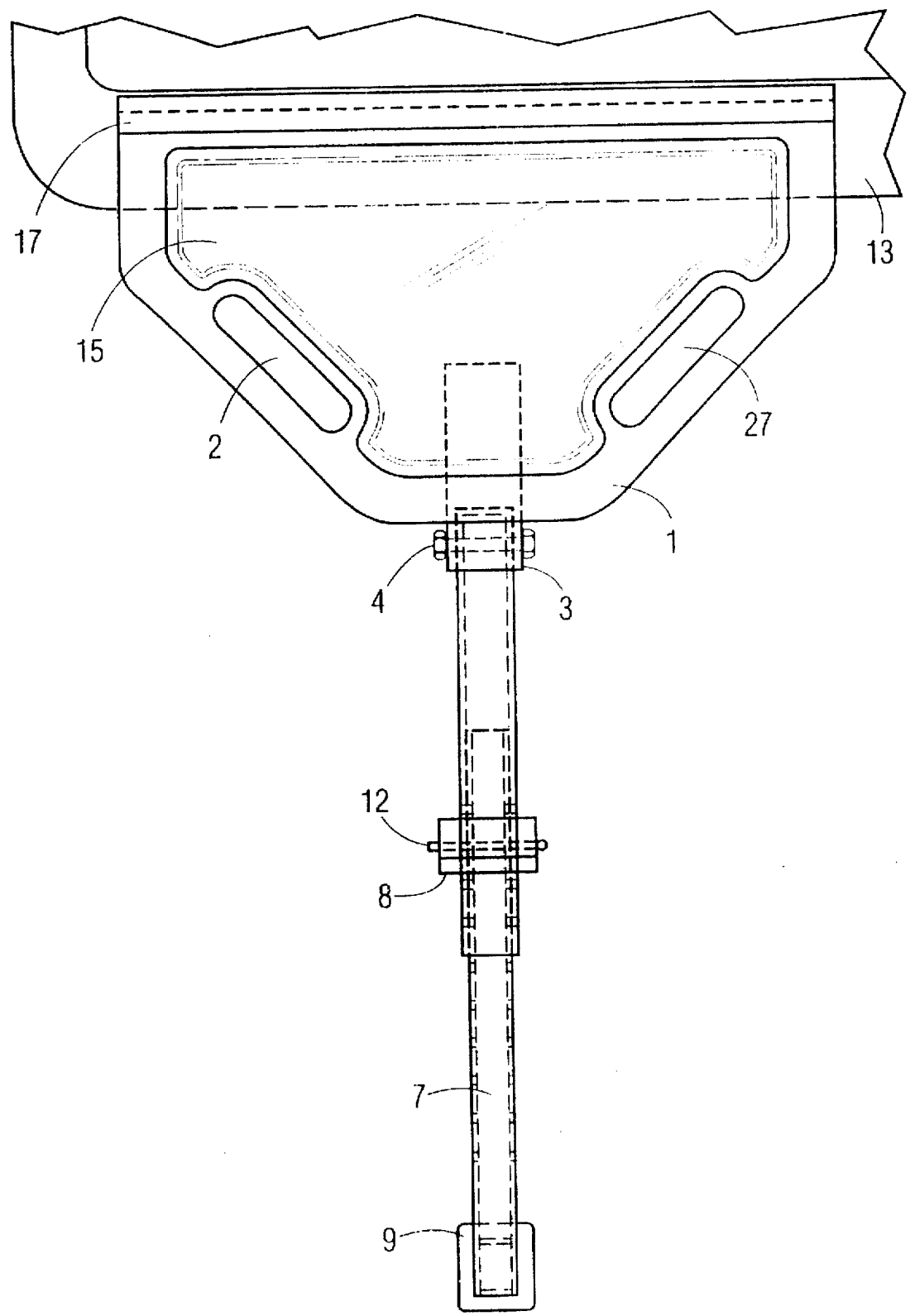
FIG. 2 is a top view of the portable seat shown in FIG. 1.
Figure 3:
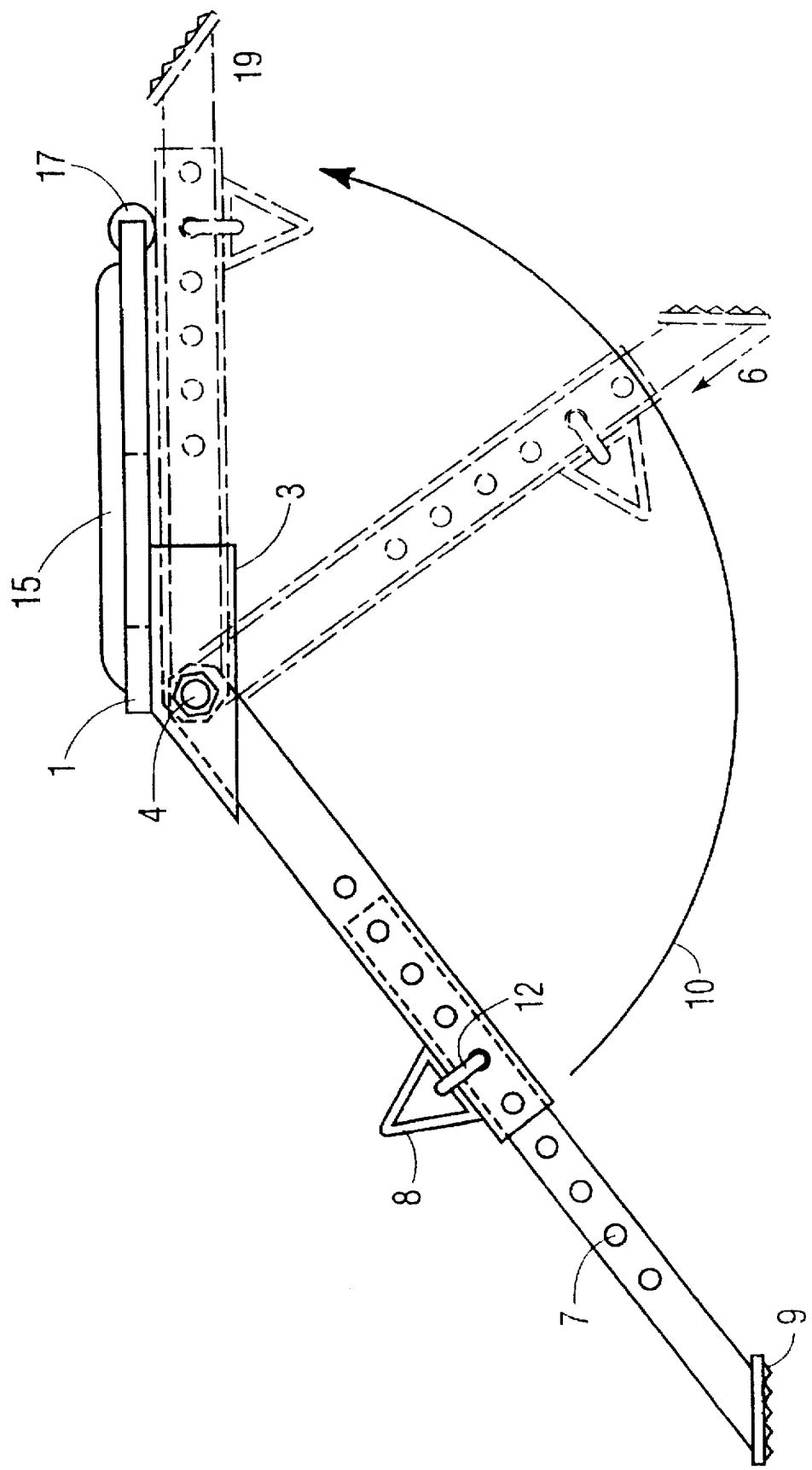
FIG. 3 is a side view of the portable seat of FIG. 1.

As shown in FIGS. 1–3, the invention includes a seat 1 having a generally triangular shape. The rear of the seat 1 is connected to a protective lip 17 which may frictionally engage the back of the seat. The seat 1 is designed to rest on the top of a vehicle bumper 13. The lip 17 protects the vehicle from damage by the seat when in use. The seat 1 may be padded as shown at 15. Handles 2 and 27 are formed in the seat 1 so that the entire assembly may be moved easily for storage or when in use.

The front of the seat 1 has a hollow collar 3 attached to the underside of the seat. The leg portion 5 is pivotally attached to the collar 3 by a pin 4. The length of the leg is adjustable. Leg portion 5 is a hollow channel. Another leg portion 7 adjustably interfits within portion 3. A plurality of holes 25 in leg portion 7 are provided so that the leg portion can be locked in a position by a locking pin such as 23 in FIG. 1 or 12 in FIG. 2. A footrest 21 is attached to another collar 19 which surrounds leg portion 5. Alternatively, the foot rest may take the form of a combined rest 8 and locking pin 12 as shown in FIGS. 2–3. The angle 10 of rotation of the leg is approximately 135°. This angle may vary by±10°. The leg portion 7 is provided with a grip foot pad 9 for engagement with ground 11.

As will now be seen, the portable seat of the present invention is stored in the position shown in FIG. 3 with the leg rotated against the bottom of the seat 1. The leg is then unfolded to the angle 10 of approximately 135° shown in FIG. 3. The leg is set in length by moving leg portion 7 in the opposite direction of arrow 6 and this position is locked by pin 23 or pin 12 by aligning the pin in the appropriate one of holes 25. The seat is placed on the top of vehicle bumper 13 with protective lip 17 abutting a portion the vehicle. Grip foot pad 9 is provided to reduce the occurrence of slippage on the ground 11.

As will now be apparent to those skilled in the art, the portable seat of the present invention provides the golfer, hunter and tailgaiter with a secure easy to use seat outside the vehicle so that the interior of the vehicle need not be used to change shoes or for other purposes.

Further modifications to the method and apparatus of the invention may be made without departing from the spirit and scope of the invention; accordingly, what is sought to be protected is set forth in the appended claims.

I claim:

1. A portable seat for mounting on the top the bumper of a vehicle comprising: a seating surface having a front portion and a rear portion, handle means formed integrally in said seating surface for carrying said seating surface, protective means frictionally attached to said rear portion for preventing damage to a vehicle, an adjustable length leg having a an upper end and a bottom end; and means attached to said front portion of said seating surface for pivotally attaching said upper end of said adjustable length leg to said front portion of said seating surface, said adjustable length leg being capable of pivoting outwardly from said front portion of said seating surface over an angle of 135° when said rear portion of said seating surface of said seat is mounted on the top of a bumper of a vehicle thereby positioning said leg in an operative position.

2. The portable seat of claim 1 wherein said adjustable length leg includes grip pad means at one end thereof for preventing slippage of said adjustable length leg on the ground.

3. The portable seat of claim 1 wherein said seating surface is padded.

4. The portable seat of claim 3 further including a foot support attached to said adjustable length leg.

5. The portable seat of claim 1 wherein said adjustable length leg includes a first hollow channel and a second hollow channel for interfitting within said first hollow channel.

6. The portable seat of claim 5 further including a plurality of holes in said second hollow channel and a single hole in said first hollow channel.

7. The portable seat of claim 6 further including locking pin means for locating one of said plurality of holes and said single hole to fix the length of said adjustable length leg.

8. The portable seat of claim 1 wherein means attached to front portion of said seating surface for pivotally attaching said upper end of said adjustable length leg to said from portion of said seating surface further includes a collar attached to a bottom surface of said from portion of said seating surface, said adjustable length leg is pivotally mounted in said collar, said collar including means formed therein for limiting the angle of pivot of said adjustable length leg from a first position in proximity to said bottom surface to a second position over an angle of about 135°.

* * * * *